(12) United States Patent
Yang

(10) Patent No.: US 11,987,727 B2
(45) Date of Patent: May 21, 2024

(54) INORGANIC FILLER DISPERSION, SUPERHYDROPHOBIC INSULATING AND WEAR-RESISTANT COATING AND PREPARATION METHOD THEREOF

(71) Applicant: TIANJIN DALV ELECTRIC POWER TECHNOLOGY CO., LTD., Tianjin (CN)

(72) Inventor: Yuntao Yang, Tianjin (CN)

(73) Assignee: TIANJIN DALV ELECTRIC POWER TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 18/480,180

(22) Filed: Oct. 3, 2023

(65) Prior Publication Data
US 2024/0124721 A1    Apr. 18, 2024

(30) Foreign Application Priority Data

Oct. 18, 2022   (CN) .......................... 202211269719.6

(51) Int. Cl.
| | | |
|---|---|---|
| C09D 7/62 | (2018.01) |
| C09C 1/30 | (2006.01) |
| C09C 1/36 | (2006.01) |
| C09C 3/12 | (2006.01) |
| C09D 5/16 | (2006.01) |
| C09D 7/40 | (2018.01) |
| C09D 7/45 | (2018.01) |
| C09D 183/06 | (2006.01) |
| C08K 3/26 | (2006.01) |
| C08K 3/30 | (2006.01) |
| C08K 3/36 | (2006.01) |
| C08K 9/06 | (2006.01) |
| C08K 13/06 | (2006.01) |

(52) U.S. Cl.
CPC .............. *C09D 7/62* (2018.01); *C09C 1/3081* (2013.01); *C09C 1/309* (2013.01); *C09C 1/3684* (2013.01); *C09C 3/12* (2013.01); *C09D 5/1618* (2013.01); *C09D 5/1675* (2013.01); *C09D 7/45* (2018.01); *C09D 7/67* (2018.01); *C09D 7/68* (2018.01); *C09D 183/06* (2013.01); *C01P 2004/62* (2013.01); *C01P 2004/64* (2013.01); *C08K 2003/265* (2013.01); *C08K 2003/3045* (2013.01); *C08K 3/36* (2013.01); *C08K 9/06* (2013.01); *C08K 13/06* (2013.01); *C08K 2201/005* (2013.01); *C08K 2201/011* (2013.01); *C08K 2201/014* (2013.01)

(58) Field of Classification Search
CPC .......... C09C 1/3081; C09C 1/309; C09D 7/62
See application file for complete search history.

(56) References Cited

U.S. PATENT DOCUMENTS

2020/0308421 A1   10/2020   Zhang et al.

FOREIGN PATENT DOCUMENTS

| CN | 113088123 A | | 7/2021 | |
|---|---|---|---|---|
| CN | 114933853 A | * | 8/2022 | |
| EP | 1294561 A1 | | 3/2003 | |
| WO | 2005/100459 A1 | | 10/2005 | |
| WO | WO-2020033357 A1 | * | 2/2020 | ............... C08K 3/36 |

* cited by examiner

*Primary Examiner* — Vickey Nerangis
(74) *Attorney, Agent, or Firm* — Leason Ellis LLP

(57) ABSTRACT

The disclosure relates to the technical field of inorganic filler and superhydrophobic coating, and in particular, to an inorganic filler dispersion, a superhydrophobic insulating and wear-resistant coating and preparation methods thereof. The inorganic filler dispersion is formed by a primary modification of the micro-nano-meter sized inorganic filler composed of a mixture of a nanometer sized inorganic filler and a submicron-meter sized inorganic filler with a hydrophobic silane coupling agent, and a secondary modification of the primary modified micro-nano-meter sized inorganic filler in an organic solvent with a hydrophobic hydroxy-terminated blocking agent and a catalyst. The inorganic filler dispersion and the hydroxyl-terminated polydimethylsiloxane and other components are ground to obtain a precoating mixture, which can be used as reinforcing component and mixed evenly with the latent curing agent and the solvent to obtain a one-component superhydrophobic insulating and wear-resistant coating.

6 Claims, No Drawings

INORGANIC FILLER DISPERSION, SUPERHYDROPHOBIC INSULATING AND WEAR-RESISTANT COATING AND PREPARATION METHOD THEREOF

CROSS-REFERENCE TO RELATED APPLICATIONS

This application claims priority to Chinese Patent Application No. CN 202211269719.6, filed on Oct. 18, 2022. The disclosure of the aforementioned application is hereby incorporated by reference in its entirety.

TECHNICAL FIELD

The disclosure relates to the technical field of inorganic filler and superhydrophobic insulating and wear-resistant coating, and in particular, to an inorganic filler dispersion, a superhydrophobic insulating and wear-resistant coating and preparation methods thereof.

BACKGROUND

In recent years, construction of ultra-high voltage (UHV) and high voltage (HV) power transmission lines has been of great significance in aspects such as power grid development, energy transmission, and economic development. The normal operation of a power transmission and transformation equipment has become a more important prerequisite for maintaining the safety and stability of a power system. However, the power transmission and transformation equipment is exposed to a complex and variable natural environment for a long time, which makes various types of safety accidents frequent. For example, pollutants such as industrial pollution, atmospheric dust, bird droppings and the like are attached to the surface of an insulator, which may cause a pollution flashover accident. Freezing rain solidified on the surface of the power transmission line or the tower tends to easily cause problems such as disconnection of the power transmission line or collapsing of the tower.

In order to solve the above problems, one of the most effective methods is to improve the hydrophobicity of the surface of the power transmission and transformation equipment, so that the power transmission and transformation equipment is not easily affected by external pollutants. For example, the surface of the power transmission and transformation equipment can be modified to be superhydrophobic, where the superhydrophobic surface is a surface with a water contact angle greater than 150° and a rolling angle of less than 10°. When the water droplets are on the superhydrophobic surface, they can quickly roll and slide, and various pollutants on the superhydrophobic surface can be washed away and eluted, thereby improving the cleanliness of the superhydrophobic surface. It is also difficult for freezing rain, ice and other similar substances to adhere stably to the superhydrophobic surface, because they can easily slip off superhydrophobic surface due to gravity.

In addition to needing a superhydrophobic surface, power transmission and transformation equipment requires special material to provide excellent insulation, wear resistance and corrosion resistance. However, it is difficult for the existing commercially available hydrophobic material to meet the requirements of power transmission and transformation equipment.

SUMMARY

The present disclosure provides an inorganic filler dispersion, a superhydrophobic insulating and wear-resistant coating and preparation methods thereof.

Technical Problems

The application provides an inorganic filler dispersion, a superhydrophobic insulating and wear-resistant coating and preparation methods thereof. The mixture of the submicron-meter sized inorganic filler and the nanometer sized inorganic filler is modified to obtain the inorganic filler dispersion, and the inorganic filler dispersion, as a reinforcing component, is added to a coating to obtain a modified coating with excellent superhydrophobicity, insulation and wear-resistance.

Technical Solutions

The present disclosure provides an inorganic filler dispersion which includes (comprises, consists essentially of, or consists of) a micro-nano-meter sized inorganic filler composed of (comprising, consisting essentially of, or consisting of) a mixture of a nanometer sized inorganic filler and a submicron-meter sized inorganic filler. The nanometer sized inorganic filler and the submicron-meter sized inorganic filler may be each independently selected from one or more of silica, titanium dioxide, zinc oxide, celite and attapulgite. The inorganic filler dispersion may be formed by a primary modification of the micro-nano-meter sized inorganic filler with a hydrophobic silane coupling agent, and a secondary modification of the primary modified micro-nano-meter sized inorganic filler in an organic solvent with a hydrophobic hydroxy-terminated blocking agent. The organic solvent may be a mixture of a high boiling point solvent and a low boiling point solvent, where the boiling point of the high boiling point solvent ranges from about 120° C. to about 250° C., and the boiling point of the low boiling point solvent ranges from about 70° C. to about 110° C.

Methods of hydrophobic modification of inorganic filler have been reported in the prior art. However, experimental testing has shown that these modified inorganic fillers are not suitable for all coating systems, and the hydrophobic effects that can be produced in different coating systems are different. For example, a modified inorganic filler that is suitable for a resin system and can make the coating hydrophobic can have decreased hydrophobic properties when applied to a silicone coating system. Additionally, coatings containing modified hydrophobic fillers do not all have both good superhydrophobicity and wear-resistance.

In the present application, the micro-nano-meter sized inorganic filler may be modified by a hydrophobic silane coupling agent and a hydrophobic hydroxyl-terminated blocking agent. The hydrophobic silane coupling agent can lower the surface energy of the micro-nano-meter sized inorganic filler, thereby reducing the probability of self-agglomeration. Furthermore, its incompatibilities with the coating system can also be increased, so that the inorganic filler dispersion after dual modifications in the prepared product can be enriched at the phase and interface of the coating, thereby forming a superhydrophobic micro-nano structure on the surface of the coating. The primary modified micro-nano-meter sized inorganic filler is then modified by a hydrophobic hydroxy-terminated blocking agent to obtain an inorganic filler dispersion. On the one hand, this can improve the hydrophobicity of the inorganic filler dispersion. On the other hand, the hydrophobic hydroxy-terminated blocking agent can also react with the latent curing agent used in the subsequent process of preparing the superhydrophobic coating. Because the inorganic filler dispersion can participate in the curing reaction, the inorganic filler dispersion can be efficiently fixed on the coating surface to form a stable superhydrophobic and wear-resistant micro-nano coating.

The hydrophobic silane coupling agent may include at least one of isooctyltriethoxysilane, butyltriethoxysilane, (3-glycidoxypropyl)trimethoxysilane and γ-methacryloyloxypropyltrimethoxysilane with tridecyloctyltriethoxysilane. The hydrophobic silane coupling agent can be used to modify the surface of the micro-nano-meter sized inorganic filler under weak alkaline conditions (such as about pH 8 to about pH 10), and a temperature of about 60° C. to about 70° C. The hydrophobic hydroxy-terminated blocking agent may be a hydroxy-terminated polydimethylsiloxane, a hydroxyl-terminated polybutadiene polyurethane or a hydroxy-terminated polypropylene glycol.

A mass of the hydrophobic silane coupling agent may be about 0.5% to about 3.0% of a total mass of the micro-nano-meter sized inorganic filler. A mass of the hydrophobic hydroxy-terminated blocking agent may be about 5% to about 20% of a total mass of the primary modified micro-nano-meter sized inorganic filler. The amount of the hydrophobic silane coupling agent and the hydrophobic hydroxy-terminated blocking agent may also be adjusted according to the desired modification effect.

The nanometer sized inorganic filler may have an average volume-based particle size ranging from about 5 nm to about 50 nm. The submicron-meter sized inorganic filler may have an average volume-based particle size ranging from about 100 nm to about 500 nm. In the micro-nano-meter sized inorganic filler, a mass percentage of the nanometer sized inorganic filler may be about 25% to about 50%. A mass percentage of the submicron-meter sized inorganic filler may be about 50% to about 75%. The combination of nanometer sized inorganic filler and a submicron-meter sized inorganic filler with different particle sizes facilitates the formation of a superhydrophobic surface with a micro-nano structure on the surface of the coating film, which provides the coating with superhydrophobic property.

The present disclosure also provides for a method of preparing the present inorganic filler dispersion, where the method may include the following step 1 and step 2.

Step 1, dispersing the micro-nano-meter sized inorganic filler in ethanol, adding aqueous ammonia to the ethanol to adjust to a pH of about 8 to about 10, then adding the hydrophobic silane coupling agent, stirring for about 2.5 hours to about 3.5 hours at about 60° C. to about 70° C., separating a solid portion from a liquid portion, and drying the solid portion to obtain the primary modified micro-nano-meter sized inorganic filler.

Step 2, dispersing the primary-modified micro-nano-meter sized inorganic filler in an organic solvent, adding the hydrophobic hydroxy-terminated blocking agent and a catalyst, and stirring for about 2.5 hours to about 3.5 hours at about 115° C. to about 125° C. to carry out a secondary modification to obtain the inorganic filler dispersion, where the catalyst includes dibutyltin dilaurate, tin(II) bis(2-ethylhexanoate), and/or dibutyltin diacetate.

The inorganic filler dispersion is triple-modified, with a primary modification of the micro-nano-meter sized inorganic filler with a hydrophobic silane coupling agent, and a secondary modification of the primary modified micro-nano-meter sized inorganic filler in an organic solvent with a hydrophobic hydroxy-terminated blocking agent. The inorganic filler dispersion has good superhydrophobicity and insulation. As a reinforcing component, the inorganic filler dispersion can be used together with an organic silicon resin, other pigment fillers, an auxiliary coating and an organic solvent, which can be used to prepare a superhydrophobic insulating and wear-resistant coating, e.g., by a conventional method of coating preparation. The present preparation methods are simple, with the micro-nano-meter sized inorganic filler being sufficiently modified.

With reference to Step 2, there is no specific limit on the mass of the organic solvent added, as long as the organic solvent can fully dissolve the primary modified micro-nano-meter sized inorganic filler. In certain embodiments, the mass of the organic solvent is 5 to 7 times of a total mass of the primary modified micro-nano-meter sized inorganic filler.

The mixed organic solvent of a high boiling point solvent and a low boiling point solvent may be used as a solvent system for the inorganic filler dispersion. The low boiling point solvent has a fast volatilization speed during the subsequent preparation of a coating, which facilitates the migration of the inorganic filler dispersion in a coating body phase to the coating surface. However, the high boiling point solvent has a relatively slow volatilization speed, which helps to slow down the film formation speed of the coating and prolong the migration time of the inorganic filler dispersion to the coating surface. Thus, the coating surface contains a large amount of the inorganic filler dispersion, thereby enhancing the superhydrophobicity of the coating.

A superhydrophobic insulating and wear-resistant coating may include the following in parts by mass: about 350 to about 360 parts of the above inorganic filler dispersion, a solid content in the inorganic filler dispersion being about 10% to about 20%, about 55 to about 70 parts of the hydroxyl-terminated polydimethylsiloxane, about 45 to about 60 parts of calcium carbonate, about 15 to about 35 parts of barium sulfate, about 10 to about 15 parts of fumed silica, about 0.4 to about 0.7 parts of a defoamer, about 1.5 to about 2.5 parts of a dispersant, about 40 to about 50 parts of a latent curing agent, about 0.8 to about 1.5 parts of a substrate wetting agent, about 2 to about 3 parts of an adhesion promoter; and about 10 to about 15 parts of a solvent.

Also encompassed by the present disclosure is a method of preparing the above superhydrophobic insulating and wear-resistant coating which may include the following step 1 and step 2.

Step 1, adding about 55 to about 70 parts of the hydroxyl-terminated polydimethylsiloxane, about 45 to about 60 parts of the calcium carbonate, about 15 to about 35 parts of the barium sulphate, about 10 to about 15 parts of the fumed silica, about 0.4 to about 0.7 parts of the defoamer and about 1.5 to about 2.5 parts of the dispersant to about 350 to about 360 parts of the inorganic filler dispersion, stirring and dispersing until uniform, and grinding to obtain a pre-coating mixture.

In step 1, an average volume-based particle size of the pre-coating mixture may be no greater than 25 microns.

Step 2, adding about 40 to about 50 parts of the latent curing agent, about 0.8 to about 1.5 parts of the substrate wetting agent, about 2 to about 3 parts of the adhesion promoter and about 10 to about 15 parts of the solvent to the pre-coating mixture, and stirring and dispersing until uniform to obtain the superhydrophobic insulating and wear-resistant coating.

In step 2, the latent curing agent may be one of vinyltris(methylethylketoximino)silane, methyltris(methylethylketoxime)silane and phenyltris(methylethylketoximio)silane. A one-component coating matrix resin system may comprise (or consist essentially of, or consist of) a butanone oxime silane curing agent and the hydroxyl-terminated polydimethylsiloxane, where the two compositions can crosslink and cure rapidly under the action of moisture in air, thereby improving the surface adhesion of a coating film.

Advantageous Effects of the Disclosure

In the embodiment of the present application, the obtained inorganic filler dispersion and the hydroxyl-terminated polydimethylsiloxane and other components can be used as reinforcing components after grinding. After the above reinforcing components are mixed with the latent curing agent and the solvent to obtain a one-component superhydrophobic insulating and wear-resistant coating. The superhydrophobic insulating and wear-resistant coating is prepared by the inorganic filler dispersion obtained through the primary and secondary modifications, and belongs to an organic silicon system. The coating has excellent superhydrophobicity, insulation and wear-resistance, with water contact angle greater than 155°, rolling angle less than 50 volume resistivity greater than $1.0 \times 10^{12}$ ohm-meter ($\Omega \cdot m$). The coating maintains excellent superhydrophobicity after grinding, and can be widely used in the fields of glass, ceramics, metal substrates and the like, especially in the field of high-voltage equipment and the like. If the surface of the power transmission and transformation equipment is coated with the present coating, a superhydrophobic structure would form on the surface of the equipment. It is difficult for freezing rain, ice and other similar substances to adhere stably to the superhydrophobic surface, as they will easily slip off the superhydrophobic surface under the effect of gravity, thereby greatly reducing the occurrence of related accidents.

DETAILED DESCRIPTION OF ILLUSTRATIVE EMBODIMENTS

The present application is further described in detail below. It should be understood that the specific embodiments described herein are only used to explain the present application, but not to limit the present application. When a range of values is disclosed in this application, the range is considered continuous and includes both the minimum and maximum values of the range, and each value between the minimum and maximum values. Further, when a range refers to an integer, each integer between the minimum and maximum values of the range is also included.

The defoamer model used in the following embodiments is Tego Airex 931, the dispersant model is Tego Dispers 650, the adhesion promoter is selected Sanzhong You SY 5620, and the substrate wetting agent model is Tego270.

Embodiment 1

The present embodiment provides an inorganic filler dispersion, and the preparation method thereof includes the following steps.

Step 1, 35 parts (parts by weight, the same below) of nanometer sized silica (average volume-based particle size 10 nm, determined by Nano Plus of Micromeritics Instruments Corporation) and 65 parts of submicron-meter sized titanium dioxide (average volume-based particle size 250 nm) were added to 1000 parts of ethanol, and an electric stirrer was started to stir the mixture. Concentrated aqueous ammonia was added to adjust the pH of the mixture to pH 8.5, and 1.8 parts of tridecyloctyltriethoxysilane and 1.2 parts of isooctyltriethoxysilane were successively added to the mixture for reacting for 3 hours at 60° C. The system after reaction was centrifuged at 6000 revolutions per minute (r/min) for 30 min, then the precipitate was collected after centrifugation and dried in an oven at 105° C. for 5 hours to obtain a primary modified micro-nano-meter sized inorganic filler.

Step 2, 180 parts of xylene, 120 parts of dichloroethane, 50 parts of the primary modified micro-nano-meter sized inorganic filler, 4.0 parts of hydroxyl-terminated polydimethylsiloxane and 0.1 parts of dibutyltin dilaurate were placed into a reaction kettle, then the mixture in the reaction kettle was stirred evenly and heated to 120° C. for reaction for 3 hours to obtain an inorganic filler dispersion.

Embodiment 2

The present embodiment provides an inorganic filler dispersion, and the preparation method thereof includes the following steps.

Step 1, 32 parts of nanometer sized silica (average volume-based particle size 10 nm) and 68 parts of submicron-meter sized celite (average volume-based particle size 400 nm) were added to 1000 parts of ethanol, and an electric stirrer was started to stir the mixture. Concentrated aqueous ammonia was added to adjust the pH of the mixture to pH 8.8, and 1.4 parts of tridecyloctyltriethoxysilane and 0.7 parts of (3-glycidoxypropyl)trimethoxysilane were successively added to the mixture for reacting for 3 hours at 65° C. The system after reaction was centrifuged at 6000 r/min for 30 min, then the precipitate was collected after centrifugation and dried in an oven at 105° C. for 5 hours to obtain a primary modified micro-nano-meter sized inorganic filler.

Step 2, 150 parts of 200 #paint solvent (mineral spirit), 150 parts of dioxane, 50 parts of the primary modified micro-nano-meter sized inorganic filler, 6.2 parts of hydroxyl-terminated polybutadiene polyurethane and 0.1 parts of tin(II) bis(2-ethylhexanoate) were placed into a reaction kettle, then the mixture in the reaction kettle was stirred evenly and heated to 120° C. for reaction for 3 hours to obtain an inorganic filler dispersion.

Embodiment 3

The present embodiment provides an inorganic filler dispersion, and the preparation method thereof includes the following steps.

Step 1, 37 parts of nanometer sized silica (average volume-based particle size 25 nm) and 63 parts of submicron-meter sized attapulgite (average volume-based particle size 350 nm) were added to 1000 parts of ethanol, and an electric stirrer was started to stir the mixture. Concentrated aqueous ammonia was added to adjust the pH of the mixture to pH 9.0, and 1.9 parts of tridecyloctyltriethoxysilane and 1.0 parts of isooctyltriethoxysilane were successively added to the mixture for reacting for 3 hours at 60° C. The system after reaction was centrifuged at 6000 r/min for 30 min, then the precipitate was collected after centrifugation and dried in an oven at 105° C. for 5 hours to obtain a primary modified micro-nano-meter sized inorganic filler.

Step 2, 166 parts of isoparaffin, 134 parts of dichloroethane, 50 parts of the primary modified micro-nano-meter sized inorganic filler, 5.0 parts of hydroxy-terminated polypropylene glycol and 0.1 parts of dibutyltin diacetate were placed into a reaction kettle, then the mixture in the reaction kettle was stirred evenly and heated to 120° C. for reaction for 3 hours to obtain an inorganic filler dispersion.

Embodiment 4

The present embodiment provides a superhydrophobic insulating and wear-resistant coating, and the preparation method thereof includes the following steps.

Step 1, 358 parts of the inorganic filler dispersion obtained in Embodiment 1, 60 parts of hydroxyl-terminated polydimethylsiloxane, 55 parts of calcium carbonate, 20 parts of barium sulfate, 15 parts of fumed silica, 0.6 part of silicone defoamer and 2.0 parts of dispersant were mixed in sequence, stirred and dispersed evenly to obtain a dispersion system, and then the dispersion system was ground to a fineness of less than 25 microns by a horizontal sand grinder to obtain a pre-coating mixture, and the pre-coating mixture was transferred to a sealed paint mixing tank.

Step 2, the sealed paint mixing tank was evacuated to remove all air and filled with nitrogen, repeating three times, and then 45 parts of vinyltris(methylethylketoximino)silane, 1.0 parts of substrate wetting agent, 2.5 parts of adhesion promoter, 13 parts of iron red paste and 10 parts of xylene were added to the evacuated sealed paint mixing tank in turn. The mixture in the evacuated sealed paint mixing tank was stirred evenly, and the mixture was discharged and stored hermetically. At last, a one-component superhydrophobic insulating and wear-resistant coating was prepared.

Embodiment 5

The present embodiment provides a superhydrophobic insulating and wear-resistant coating, and the preparation method thereof includes the following steps.

Step 1, 355 parts of the inorganic filler dispersion obtained in Embodiment 2, 70 parts of hydroxyl-terminated polydimethylsiloxane, 50 parts of calcium carbonate, 18 parts of barium sulfate, 12 parts of fumed silica, 0.5 part of defoamer and 1.8 parts of dispersant were mixed in sequence, stirred and dispersed evenly to obtain a dispersion system, and then the dispersion system was ground to a fineness of less than 25 microns by a horizontal sand grinder to obtain a pre-coating mixture, and the pre-coating mixture was transferred to a sealed paint mixing tank.

Step 2, the sealed paint mixing tank was evacuated to remove all air and filled with nitrogen, repeating three times, and then 47 parts of vinyltris(methylethylketoximino)silane, 1.0 parts of substrate wetting agent, 2.5 parts of adhesion promoter, 13 parts of iron red paste and 12 parts of 200 #paint solvent were added to the evacuated sealed paint mixing tank in turn. The mixture in the evacuated sealed paint mixing tank was stirred evenly, and the mixture was discharged and stored hermetically. At last, a one-component superhydrophobic insulating and wear-resistant coating was prepared.

Embodiment 6

The present embodiment provides a superhydrophobic insulating and wear-resistant coating, and the preparation method thereof includes the following steps.

Step 1, 355 parts of the inorganic filler dispersion obtained in Embodiment 3, 55 parts of hydroxyl-terminated polydimethylsiloxane, 50 parts of calcium carbonate, 34 parts of barium sulfate, 11 parts of fumed silica, 0.6 part of defoamer and 1.9 parts of dispersant were mixed in sequence, stirred and dispersed evenly to obtain a dispersion system, and then the dispersion system was ground to a fineness of less than 25 microns by a horizontal sand grinder to obtain a pre-coating mixture, and the pre-coating mixture was transferred to a sealed paint mixing tank.

Step 2, the sealed paint mixing tank was evacuated to remove all air and filled with nitrogen, repeating three times, and then 44 parts of methyltris(methylethylketoxime)silane, 1.0 parts of substrate wetting agent, 2.5 parts of adhesion promoter, 13 parts of iron red paste and 10 parts of isoparaffin were added to the evacuated sealed paint mixing tank in turn. The mixture in the evacuated sealed paint mixing tank was stirred evenly, and the mixture was discharged and stored hermetically. At last, a one-component superhydrophobic insulating and wear-resistant coating was prepared.

Comparative Embodiment 1

100 parts of nanometer sized silica was added to 1000 parts of ethanol, and an electric stirrer was started to stir the mixture. Concentrated aqueous ammonia was added to adjust the pH of the mixture to pH 8.8, and 1.4 parts of tridecyloctyltriethoxysilane and 0.7 parts of (3-glycidoxypropyl)trimethoxysilane were successively added to the mixture for reacting for 3 hours at 65° C. The system after reaction was centrifuged at 6000 r/min for 30 min, then the precipitate was collected after centrifugation and dried in an oven at 105° C. for 5 hours to obtain a primary modified micro-nano-meter sized inorganic filler. The remaining steps were the same as those in Embodiment 1 and Embodiment 4, and finally a coating was prepared.

Comparative Embodiment 2

A coating was prepared with reference to Comparative Embodiment 1, and a nanometer sized silica in Comparative Embodiment 1 was replaced with an equal amount of a submicron-meter sized titanium dioxide during preparation in Comparative Embodiment 2, and the remaining steps were the same as Comparative Embodiment 1.

Comparative Embodiment 3

A primary modified micro-nano-meter sized inorganic filler was prepared with reference to step 1 of Embodiment 1, and step 2: 50 parts of the primary modified micro-nano-meter sized inorganic filler, 300 parts of xylene, 4.0 parts of hydroxyl-terminated polydimethylsiloxane and 0.1 parts of dibutyltin dilaurate were placed into a reaction kettle, then the mixture in the reaction kettle was stirred evenly and heated to 120° C. for reaction for 3 hours to obtain an inorganic filler dispersion; the remaining steps were the same as those in Embodiment 4, and finally a coating was prepared.

Comparative Embodiment 4

A coating was prepared with reference to Comparative Embodiment 3, and xylene in Comparative Embodiment 3 was replaced with an equal amount of dichloroethane during preparation in Comparative Embodiment 4, and the remaining steps were the same as Comparative Embodiment 3.

Comparative Embodiment 5

A primary modified micro-nano-meter sized inorganic filler was prepared with reference to step 1 of Embodiment 2, and step 2: 50 parts of the primary modified micro-nanometer sized inorganic filler was dispersed in a mixture containing 150 parts of 200 #paint solvent and 150 parts of dioxane, to obtain an inorganic filler dispersion. The remaining steps were the same as those in Embodiment 4, and finally a coating was prepared.

Performance Testing Embodiment.

The coatings prepared in Embodiments 4 to 6 and Comparative Embodiments I to 5 were each coated on a glass surface and cured at room temperature for 7 days. The data of coating film adhesion, water contact angle, rolling angle, volume resistivity and water contact angle and rolling angle after grinding were obtained and shown in Table 1 (the grinding condition was 100 times with 800 mesh sandpaper under a pressure of 500 kPa).

It should be noted that the present coating may also be used on a ceramic surface, a metal substrate surface, and the like. The glass surface in the above performance testing embodiment is exemplary. When the coatings prepared in Embodiments 4 to 6 and Comparative Embodiments E to 5 are coated on a metal substrate surface or a ceramic surface, it has similar properties and effects to coated on the glass surface. For example, when coated on a high-pressure bare wire, a superhydrophobic surface can be achieved.

submicron-meter sized inorganic filler comprises silica, titanium dioxide, zinc oxide, celite, attapulgite, or combinations thereof, and the submicron-meter sized inorganic filler has an average volume-based particle size ranging from 100 nm to 500 nm;

wherein in the micro-nano-meter sized inorganic filler, a mass percentage of the nanometer sized inorganic filler is 25% to 50%, and a mass percentage of the submicron-meter sized inorganic filler is 50% to 75%;

wherein the inorganic filler dispersion is formed by a primary modification of the micro-nano-meter sized inorganic filler with a hydrophobic silane coupling agent, and a secondary modification of the primary modified micro-nano-meter sized inorganic filler in an organic solvent with a hydrophobic hydroxy-terminated blocking agent;

wherein the hydrophobic silane coupling agent comprises at least one of isooctyltriethoxysilane, butyltriethoxysilane, (3-glycidoxypropyl)trimethoxysilane and 7-methacryloyloxypropyltrimethoxysilane with tridecyloctyltriethoxysilane; the organic solvent is a mixed solvent of a high boiling point solvent and a low boiling point solvent; the boiling point of the high boiling point solvent ranges from 120° C. to 250° C., and the boiling

TABLE 1

Basic Performance of the Coatings Prepared in Embodiments 4 to 6 and Comparative Embodiments 1 to 5.

| | Experiment item | Embodiment 4 | Embodiment 5 | Embodiment 6 | Comparative Embodiment 1 | Comparative Embodiment 2 | Comparative Embodiment 3 | Comparative Embodiment 4 | Comparative Embodiment 5 |
|---|---|---|---|---|---|---|---|---|---|
| Coating film (before grinding) | Coating film adhesion (GB/T9 286-1998) | ISO level I | ISO level I | ISO level I | ISO level I | ISO level I | ISO level I | ISO level II | ISO level I |
| | Water contact angle | 162° | 157° | 163° | 137° | 115° | 122° | 103° | 160° |
| | Rolling angle | 3° | 4° | 2° | 15° | 32° | 16° | 27° | 3° |
| | Volume resistivity (Ω · m) | $1.3 \times 10^{12}$ | $1.4 \times 10^{12}$ | $1.1 \times 10^{12}$ | $1.2 \times 10^{12}$ | $1.2 \times 10^{12}$ | $1.0 \times 10^{12}$ | $1.1 \times 10^{12}$ | $1.1 \times 10^{12}$ |
| Coating film (after grinding) | Water contact angle | 155° | 152° | 158° | / | / | / | / | 135° |
| | Rolling angle | 6° | 7° | 5° | / | / | / | / | 16° |

The foregoing descriptions are merely preferred embodiments of the present application, but are not intended to limit the present application. Any modification, equivalent replacement, and improvements made within the spirit and principle of the present application shall belong to the scope of the present application.

What is claimed is:

1. An inorganic filler dispersion, comprising: a micro-nano-meter sized inorganic filler composed of a mixture of a nanometer sized inorganic filler and a submicron-meter sized inorganic filler;
    wherein the nanometer sized inorganic filler comprises silica, titanium dioxide, zinc oxide, celite, attapulgite, or combinations thereof, and the nanometer sized inorganic filler has an average volume-based particle size ranging from 5 nanometer (nm) to 50 nm; wherein the point of the low boiling point solvent ranges from 70° C. to 110° C.; the hydrophobic hydroxy-terminated blocking agent comprises a hydroxy-terminated polydimethylsiloxane, a hydroxy-terminated polybutadiene polyurethane, or a hydroxy-terminated polypropylene glycol;

wherein a mass of the hydrophobic silane coupling agent is 0.5% to 3.0% of a total mass of the micro-nano-meter sized inorganic filler; and wherein a mass of the hydrophobic hydroxy-terminated blocking agent is 5% to 20% of a total mass of the primary modified micro-nano-meter sized inorganic filler.

2. A method of preparing the inorganic filler dispersion of claim 1, the method comprising:
    step 1, dispersing the micro-nano-meter sized inorganic filler in ethanol, adding aqueous ammonia to the ethanol to adjust a pH to 8 to 10, then adding the hydrophobic silane coupling agent, stirring for 2.5 hours (h) to 3.5 h at 60° C. to 70° C., separating a solid portion from a liquid portion, and drying the solid portion to obtain the primary modified micro-nano-meter sized inorganic filler; and step 2, dispersing the primary modified micro-nano-meter sized inorganic filler in the organic solvent, adding the hydrophobic hydroxy-terminated blocking agent and a catalyst, and stirring for 2.5 h to 3.5 h at 115° C. to 125° C. to carry out a secondary modification to obtain the inorganic filler dispersion;

wherein the catalyst comprises dibutyltin dilaurate, tin(II) bis(2-ethylhexanoate) or dibutyltin diacetate.

3. The method according to claim 2, wherein in step 2, a mass of the organic solvent is 5 to 7 times of a total mass of the primary modified micro-nano-meter sized inorganic filler.

4. A superhydrophobic insulating and wear-resistant coating, comprising the following in parts by mass:
  (a) 350 to 360 parts of an inorganic filler dispersion, wherein the inorganic filler dispersion comprises: a micro-nano-meter sized inorganic filler composed of a mixture of a nanometer sized inorganic filler and a submicron-meter sized inorganic filler;
  wherein the nanometer sized inorganic filler comprises silica, titanium dioxide, zinc oxide, celite, attapulgite, or combinations thereof, and the nanometer sized inorganic filler has an average volume-based particle size ranging from 5 nm to 50 nm; wherein the submicron-meter sized inorganic filler comprises silica, titanium dioxide, zinc oxide, celite, attapulgite, or combinations thereof, and the submicron-meter sized inorganic filler has an average volume-based particle size ranging from 100 nm to 500 nm;
  wherein in the micro-nano-meter sized inorganic filler, a mass percentage of the nanometer sized inorganic filler is 25% to 50%, and a mass percentage of the submicron-meter sized inorganic filler is 50% to 75%;
  wherein the inorganic filler dispersion is formed by a primary modification of the micro-nano-meter sized inorganic filler with a hydrophobic silane coupling agent, and a secondary modification of the primary modified micro-nano-meter sized inorganic filler in an organic solvent with a hydrophobic hydroxy-terminated blocking agent;
  wherein the hydrophobic silane coupling agent comprises at least one of isooctyltriethoxysilane, butyltriethoxysilane, (3-glycidoxypropyl)trimethoxysilane and 7-methacryloyloxypropyltrimethoxysilane with tridecyloctyltriethoxysilane; the organic solvent is a mixed solvent of a high boiling point solvent and a low boiling point solvent; the boiling point of the high boiling point solvent ranges from 120° C. to 250° C., and the boiling point of the low boiling point solvent ranges from 70° C. to 110° C.; the hydrophobic hydroxy-terminated blocking agent comprises a hydroxy-terminated polydimethylsiloxane, a hydroxy-terminated polybutadiene polyurethane, or a hydroxy-terminated polypropylene glycol; a solid content in the inorganic filler dispersion being 10% to 20%;
  (b) 55 to 70 parts of the hydroxy-terminated polydimethylsiloxane;
  (c) 45 to 60 parts of calcium carbonate;
  (d) 15 to 35 parts of barium sulfate;
  (e) 10 to 15 parts of fumed silica;
  (f) 0.4 to 0.7 parts of a defoamer;
  (g) 1.5 to 2.5 parts of a dispersant;
  (h) 40 to 50 parts of a latent curing agent;
  (i) 0.8 to 1.5 parts of a substrate wetting agent;
  (j) 2 to 3 parts of an adhesion promoter; and
  (k) 10 to 15 parts of a solvent.

5. A method of preparing the superhydrophobic insulating and wear-resistant coating of claim 4, the method comprising:
  step 1, adding 55 to 70 parts of the hydroxy-terminated polydimethylsiloxane, 45 to 60 parts of the calcium carbonate, 15 to 35 parts of the barium sulfate, 10 to 15 parts of the fumed silica, 0.4 to 0.7 parts of the defoamer and 1.5 to 2.5 parts of the dispersant to 350 to 360 parts of the inorganic filler dispersion, stirring and dispersing until uniform, and grinding to obtain a pre-coating mixture; and
  step 2, adding 40 to 50 parts of the latent curing agent, 0.8 to 1.5 parts of the substrate wetting agent, 2 to 3 parts of the adhesion promoter and 10 to 15 parts of the solvent to the pre-coating mixture, and stirring and dispersing until uniform to obtain the superhydrophobic insulating and wear-resistant coating.

6. The method according to claim 5, wherein in step 1, an average volume-based particle size of the pre-coating mixture is no greater than 25 microns;
and wherein in step 2, the latent curing agent is vinyltris(methylethylketoximino)silane, methyltris(methylethylketoxime)silane, or phenyltris(methylethylketoximino)silane.

* * * * *